United States Patent [19]

Schmitt et al.

[11] Patent Number: 4,843,284
[45] Date of Patent: Jun. 27, 1989

[54] METHOD FOR DRIVING A PICTURE TUBE WITH FRONT PANE OF DIFFERING THICKNESS AND CIRCUIT ASSEMBLY FOR EXECUTING THE METHOD

[75] Inventors: Roland Schmitt, Erlangen; Rudolf Beuter, Furth, both of Fed. Rep. of Germany

[73] Assignee: TA-TRIUMPH-ADLER Aktiengesellschaft, Fed. Rep. of Germany

[21] Appl. No.: 212,333

[22] Filed: Jun. 27, 1988

[30] Foreign Application Priority Data

Jun. 27, 1987 [DE] Fed. Rep. of Germany ....... 3721326

[51] Int. Cl.$^4$ ............................................. H01J 29/56
[52] U.S. Cl. ................................... 315/371; 315/383; 358/168
[58] Field of Search ................. 315/371, 383; 358/168

[56] References Cited

U.S. PATENT DOCUMENTS 4,360,826 11/1982 Miyazaki et al. ................... 315/371
4,742,397 5/1988 Ferla et al. ........................... 358/168

*Primary Examiner*—Theodore M. Blum
*Attorney, Agent, or Firm*—Browdy and Neimark

[57] ABSTRACT

Method for driving a picture tube and circuit assembly for executing the method. Video screens of recent construction have a thickness of the glass increasing towards the corners for reasons of mechanical stability, for this reason and because of the differing absorption of the emitted light through the glass, uneven illumination of the video screen results. For even illumination of the video screen a variable correction voltage is superimposed on the voltage difference at the electrodes of the picture tube which determine the beam current synchronously to the deflection of the cathode beam, the level of the correction voltage being automatically adjustable to the thickness of the glass at the respective location of the cathode beam. The drive method can be used for all picture tubes constructed in accordance with the construction principle mentioned.

4 Claims, 1 Drawing Sheet

METHOD FOR DRIVING A PICTURE TUBE WITH FRONT PANE OF DIFFERING THICKNESS AND CIRCUIT ASSEMBLY FOR EXECUTING THE METHOD

BACKGROUND OF THE INVENTION

1. Field Of The Invention

The invention relates to a method for driving a picture tube, the front pane of the picture tube having a vertical as well as a horizontal glass thickness which varies in accordance with a known function and where a voltage difference, consisting of a DC voltage level determining the background brightness and the video signal voltage, is applied to the two electrodes which determine the beam current of the cathode beam, as well as to a circuit assembly for executing the method.

2. The Prior Art

Because of the requirement for having a display surface on video screens which is curved as little as possible, picture tubes are in use today having, because of the large radius of curvature of the front pane, a glass thickness which continuously increases in the direction of the edge of the front pane in order to maintain structural stability. Furthermore, to improve contrast, the front pane in such video screens is customarily colored in such a way that transparency lies at approximately 50%. Since, for technical reasons, the glass can only be evenly colored, the transparency is reversely proportional to the glass thickness. For this reason, when such picture tubes are used, there is an uneven brightness distribution on the video screen. Maximum brightness occurs at the center of the screen and is evenly reduced in the direction for the corners of the video screen.

The conditions described above have the result that, in particular in connection with video screen displays of data processing devices, the eyes of the operator are severely stressed exactly because of this uneven brightness distribution.

SUMMARY OF THE INVENTION

Therefore it is an object of the invention to recite a method for the driving of picture tubes of the type described above which balances the uneven distribution of the brightness on the video screen discussed above.

It is a further object of the invention to recite a circuit assembly for the execution of the method.

According to the present invention, a method is provided for driving a picture tube, the front pane of the picture tube having a vertical as well as a horizontal glass thickness which varies in accordance with a known function, the method comprising the steps of applying a voltage difference consisting of a DC voltage level determining the background brightness and the video signal voltage, to the two electrodes which determine the beam current of the cathode beam, and superimposing a correction voltage on the voltage difference during bright-up scanning, the level of the correction voltage being automatically adjustable, responsive to the respective place on the video screen where the cathode beam happens to be located during its vertical or horizontal deflection, depending on the thickness of the glass prevalent there.

The correction voltage is generated by generating a first correction signal such that the level of the first correction signal during the horizontal deflection of the cathode beam shows a progress which is approximately proportional to the progress of the thickness of the glass along the horizontal line through the center of the front pane, generating a second correction signal such that the level of the second correction signal during the vertical deflection of the cathode beam shows a progress which is approximately proportional to the progress of the thickness of the glass along the vertical line through the center of the front pane and summing the first correction signal and the second correction signal together to obtain the correction voltage.

The first correction signal is generated by means of a first function generator, the second correction signal is generated by means of a second function generator, and the start of the generation of the first correction signal is synchronized with the start of each horizontal deflection and the start of the generation of the second correction signal with the start of each vertical deflection.

The first correction signal is generated from the horizontal deflection current and the second correction signal from the vertical deflection current, each by means of integration of a voltage proportional to the current.

A circuit assembly for executing the method according to the present invention is provided which includes a first integrator having an input which taps off a voltage proportional to the horizontal deflection current from the circuit for the horizontal deflection via a current-voltage converter, a second integrator having an input which taps off a voltage proportional to the vertical deflection current from the circuit for the vertical deflection via a current-voltage converter, wherein an output of the first integrator, an output of the second integrator, and an output of a device for setting the background brightness are routed to the inputs of a summer circuit, and an output of the summer circuit is routed to the one electrode of the picture tube which determines the beam current.

By means of the method according to the present invention, a decrease of the brightness towards the corners of the video screen is prevented in a simple and thus advantageous manner so that assuming a constant video signal, the brightness is the same on the entire video screen. Thus an evenly illuminated background or an evenly bright symbol display is achieved, in particular with the display of text on the video screen.

The method permits the generation of the correcting voltage in a simple manner with the aid of only two correcting signals. The correcting signals themselves can be generated in a simple and thus advantageous manner.

The circuit assembly according to the present invention permits the execution of the method according to the invention with the use of only a few, cost-efficient components.

BRIEF DESCRIPTION OF THE INVENTION

Exemplary embodiments of the method according to the invention as well as the circuit assembly according to the invention are described in detail below by means of the drawings, in which.

DETAILED DESCRIPTION OF THE PREFERRED EMBODIMENTS

Figure 1:
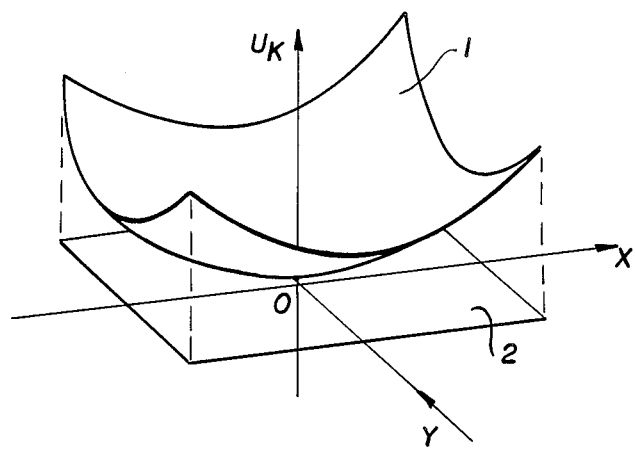
FIG. 1 shows a correction voltage field.

FIG. 1, in a three-dimensional coordinate system, shows a correction voltage field 1. The representation is in relation to the usable video screen surface 2, which is disposed in the plane formed by the x- and y-axes in such a way that the center of the video screen is located in the origin of the coordinates. The correction voltage field 1 rises in the direction of the coordinate axis as designated with $U_k$ above the video screen surface. As shown in the drawing, the correction voltage $U_k$ is zero in the center of the video screen, increases towards the outside and attains its maximum value in the corners of the video screen.

Of course, FIG. 1 only shows the relations in a qualitative manner, because the quantitative statements in regard to the correction voltage depend on the video screen used. The quantitative determination of the correction voltage field 1 shown therefore takes place by use of the data furnished by the manufacturer of the video screen regarding the thickness of the glass of the front pane or by determining the thickness of the glass of the front pane by measuring it. As already mentioned in the beginning, the thickness of the glass is reversely proportional to the transparency. From this it follows that the increase in the thickness of the glass at a specific place on the video screen in relation to the center of the video screen must be directly proportional to the correction voltage required at this place, so that the correction voltage field 1 can be directly determined from the extent of the thickness of the glass.

Of course the correction voltage field 1 can also be determined in a purely empirical way by measurement of the effect of arbitrarily selected correction voltage fields on the distribution of brightness on the video screen.

To balance the differences in brightness it is necessary to apply the correction voltage, set in the correction voltage field synchronously with the scanning of the video screen surface by the cathode beam, to the two electrodes which determine the beam current. A number of differing ways to proceed are conceivable in connection with this, of which a digital and an analog method will be further described below.

With the digital creation of the correction voltage the correction voltage field shown in FIG. 1 exists dissolved into discrete values which are stored in a digital memory. The contents of the memory are read out synchronously to the scanning of the video screen by the cathode beam, are transformed into the correction voltage by a digital/analog converter and superimposed on the voltage difference applied to the two electrodes which determine the beam current. The characteristic progress of the vertical and horizontal deflection current can be utilized for the synchronization between the scanning of the video screen by the cathode beam and the read-out of the memory. In this manner the start of the read-out process is synchronized with the start of the vertical deflection and the read-out of the correction voltage series applicable to the respective video screen line with the start of the horizontal deflection of this video screen line. Read-out of the correction voltage within a line takes place in accordance with a preset time screen.

Of course, many variations are conceivable in connection with the method described above, however, they are easily derived from the above so that further explanations are not necessary.

With the analog method for the generation of the correction voltage, use is made of the fact that with video screens of the type mentioned above which are customary today, the entire progress of the increase of the thickness of the front pane of the video screen can be shown with sufficient exactness by superimposition of the progress of the increase of the thickness along the horizontal line through the center of the video screen on the progress of the increase of the thickness along the vertical line through the center of the video screen. The term "superimposition" means that in regard to any arbitrary point on the front pane those thicknesses are added which are defined by the projection of the coordinates of this point onto the previously mentioned progresses of the increase in thickness.

Thus, based on the previously mentioned situation there are only two function generators required for the generation of the correction voltage. The first function generator generates a first correction signal which is approximately proportional to the progress of the increase of the thickness of the glass along the vertical line through the center of the front pane, the second function generator generates a signal which is approximately proportional to the progress of the increase of the thickness of the glass along the vertical line through the center of the front pane. The first function generator is triggered by the start of each horizontal deflection of the cathode beam during the scanning of a video screen line, while the second function generator is triggered by the start of each vertical deflection of the cathode beam scanning the video screen. The correction voltage can now be generated from the initial levels of the function generators by summing and can be superimposed on the voltage difference of the two electrodes which determine the beam current.

As mentioned above, the two function generators are triggered by the start of the horizontal or vertical deflection. The bottom bend in the course of the approximately saw-tooth shaped deflection current for the horizontal or vertical deflection offers itself as a trigger signal.

To generate the first correction signal and the second correction signal it is possible to detach, from the deflection circuit for the horizontal or vertical deflection, a voltage which is proportional to the respective deflection current. These two voltages then also have an approximately saw-toothed shape. By integrating respectively that part of the progress of the two voltages beginning with the bottom bend and ending with the top bend, two approximately parabola-shaped signals can be generated in synchronization with the horizontal or vertical deflection. As shown in practical tests, these two signals result, with corresponding level adjustment and the summing previously described, in a sufficiently exact correction voltage which permits a relatively exact adjustment of the brightness distribution by superimposition on the voltage difference.

The analog method for the generation of the correction voltage described above also should be considered as only one among many possibilities. In particular for generating the two correction signals and the following summing, digital solutions are conceivable in modifications of the example described. The two function generators could be digital memories in which the progress of the correction signals mentioned, resolved into discrete values, is digitally stored. The subsequent summing then takes place in a practical manner by addition of the digital values from the memory. Synchronization then also is achieved by using the characteristic progress of the horizontal deflection current (bottom bend) for the read-out of the first correction signal or of the vertical deflection current (bottom bend) for the read-out of the second correction signal.

Of course a corresponding digital-analog conversion of the correction voltage, which is in digital form, after summing must be provided in connection with the digital generation of the first or second correction signals described.

Figure 2:
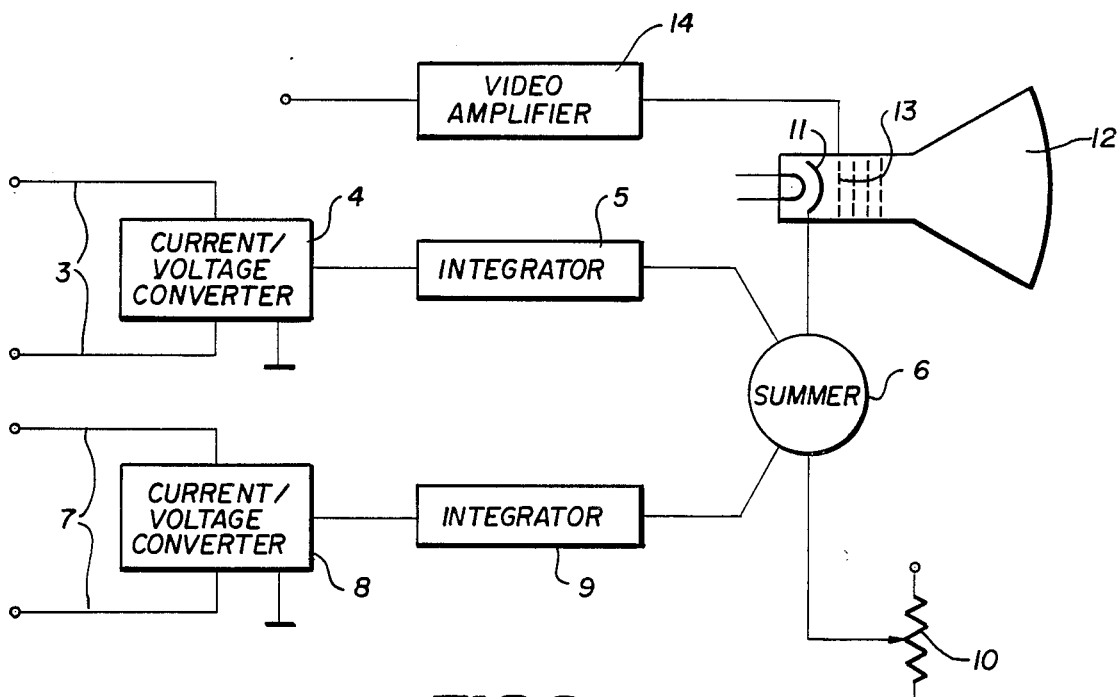
FIG. 2 shows a circuit assembly for the generation of the voltage difference between the cathode and the first grid of a picture tube.

A circuit assembly for the described analog generation of the correction voltage is shown in FIG. 2.

The output of a current-voltage converter 4, connected with its input via lines 3 to the horizontal deflection circuit (not shown), is connected with the input of a first integrator 5, the output of which is routed to a first input of a summer circuit 6. The vertical deflection circuit (not shown) is connected via lines 7 with the input of a second current-voltage converter 8, the output of which is connected with the input of a second integrator 9, the output of which, in turn, is connected with a second input of the summer circuit 6. Finally, the third input of the summer circuit 6 is connected to the tap of a potentiometer 10 which is supplied with a DC voltage for the generation of the cathode pre-voltage by a voltage source (not shown). The output of the summer circuit 6 is routed to the cathode 11 of a picture tube 12, the first grid 13 of which is connected with the output of a video amplifier 14.

For describing the function of the circuit arrangement discussed above it should be mentioned beforehand that the saw-tooth shaped deflection currents for the horizontal deflection (lines 3) and the vertical deflection (lines 7) flow through the lines 3 and 7.

By means of the current-voltage converters 4 and 8, a conversion of the deflection currents into proportional voltages takes place which, like the former, also have saw-tooth shape. The voltage thus obtained, which is proportional to the horizontal deflection current, is routed to the first integrator 5, and the voltage proportional to the vertical deflection current is routed to the second integrator 9.

To simplify further consideration it should be noted here that the cathode beam is blank during line retrace or picture retrace. From this it follows that for further consideration only that part of the deflection currents or of the voltages proportional to the deflection currents need be considered which respectively starts at the bottom bend of the saw-tooth curve and ends with the top bend, i.e. corresponds to a linearly rising function. Such a progress of the voltage at the inputs of the integrators 5 and 9 generates a parabola-shaped voltage progress at their outputs. By addition of these two parabola-shaped voltages to the DC voltage generated at the tap of the potentiometer 10 by means of the summer circuit 6, a correction voltage field is traversed at its output and thus at the cathode 11 during scanning of the video screen by the bright-up cathode beam which approximately corresponds to the picture in FIG. 1 but with the difference that there only the correction voltage portion is shown and not the DC voltage portion delivered by the potentiometer.

If during scanning of the video screen by the bright-up cathode beam, a constant video signal is fed to the first grid 13 by the video amplifier 14, an even distribution of brightness on the video screen results because of the variation of the voltage at the cathode 11 synchronous to the beam deflection.

Of course it may be required to perform level adjustments in connection with the circuit described above. However, these steps as commonly known and do not require further description. Additionally there is of course either the possibility of relating the correction signal with the thinnest place on the front pane (center of the video screen), as was done in the description above, or to the thickest place on the front pane (corners of the video screen). In the first case the result is the correction voltage field in accordance with FIG. 1, in the second case the correction voltage field in accordance with FIG. 1 is displaced so that the corner points lie in the x-y plane. It should be mentioned in closing that for utilizing the principle for the generation of an equal brightness distribution across the entire video screen described above it is of course of no consequence whether the picture tube is operated in a cathode controlled or grid controlled manner, since the required steps for one or the other type of control are an inevitable result of the physical interrelationships.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method for driving a picture tube, the picture tube having a front pane which has a vertical as well as a horizontal glass thickness which varies in accordance with a known function, the method comprising the steps of:
   applying a voltage difference, consisting of a d.c. voltage level determining the background brightness and the video signal voltage, to the electrodes which determine the beam current of the cathode beam;
   generating a first correction signal such that the level of the first correction signal during the horizontal deflection of the cathode beam shows a progress which is approximately proportional to the progress of the thickness of the glass along the horizontal line through the center of the front pane;
   generating a second correction signal such that the level of the second correction signal during the vertical deflection of the cathode beam shows a progress which is approximately proportional to the progress of the thickness of the glass along the vertical line through the center of the front pane;
   summing the first correction signal and the second correction signal together to obtain the correction voltage; and
   superimposing the correction voltage on the voltage difference during bright-up scanning, the level of the correction voltage being automatically adjustable, responsive to the respective place on the video screen where the cathode beam is located during its vertical or horizontal deflection, depending on the thickness of the glass prevalent there.

2. A method in accordance with claim 1 further comprising the step of synchronizing the start of generation of the first correction signal with the start of each horizontal deflection and the start of generation of the second correction signal with the start of each vertical deflection and wherein the step of generating the first correction signal comprises the step of generating the first correction signal using 3. A method in accordance with claim 1, wherein the step of generating the first correction signal comprises the step of generating the first correction signal from the horizontal deflection current by means of integration of a voltage proportional to the current and the step of generating the second correction signal comprises the step of generating the second correction signal from the vertical deflection current by means of integration of a voltage proportional to the current.

4. A circuit assembly for executing a method for driving a picture tube, the picture tube having a front pane which has a vertical as well as a horizontal glass thickness which varies in accordance with a known function, the method including the steps of applying a voltage difference, consisting of a d.c. voltage level determining the background brightness and the video signal voltage, to the electrodes which determine the beam current of the cathode beam, generating a first correction signal such that the level of the first correction signal during the horizontal deflection of the cathode beam shows a progress which is approximately proportional to the progress of the thickness of the glass along the horizontal line through the center of the front pane, generating a second correction signal such that the level of the second correction signal during the vertical deflection of the cathode beam shows a progress which is approximately proportional to the progress of the thickness of the glass along the vertical line through the center of the front pane, summing the first correction signal and the second correction signal together to obtain the correction voltage, and superimposing the correction voltage on the voltage difference during bright-up scanning, the level of the correction voltage being automaticaly adjustable, responsive to the respective place on the video screen where the cathode beam is located during its vertical or horizontal deflection, depending on the thickness of the glass prevalent there, the circuit assembly comprising:

a first integrator having an input which taps off a voltage proportional to the horizontal deflection current from the circuit for the horizontal deflection via a current-voltage converter;

a second integrator having an input which taps off a voltage proportional to the vertical deflection current from the circuit for the vertical deflection via a current-voltage converter;

wherein an output of the first integrator, an output of the second integrator, and an output of a device for setting the background brightness are routed to the inputs of a summer circuit; and an output of the summer circuit is routed to the one electrode of the picture tube which determines the beam current.

* * * * *